United States Patent [19]
Westerlage et al.

[11] Patent Number: 5,724,243
[45] Date of Patent: Mar. 3, 1998

[54] METHOD AND APPARATUS FOR DETERMINING EXPECTED TIME OF ARRIVAL

[75] Inventors: Kenneth R. Westerlage, Fort Worth; William C. Kennedy, III; William C. Saunders, both of Dallas; Dale E. Beasley, Flower Mound; William L. Hoag, Farmers Branch, all of Tex.

[73] Assignee: HighwayMaster Communications, Inc., Dallas, Tex.

[21] Appl. No.: 387,221

[22] Filed: Feb. 10, 1995

[51] Int. Cl.$^6$ ................................................ G01C 23/00
[52] U.S. Cl. .................... 364/446; 364/448; 364/449.7; 364/449.95; 340/994; 342/457
[58] Field of Search ................... 364/443, 444, 364/446, 448, 449; 342/357, 386, 450, 456, 454, 457, 458, 461; 340/988, 989, 991, 992, 993, 994

[56] References Cited

U.S. PATENT DOCUMENTS

| Re. 34,034 | 8/1992 | O'Sullivan | 379/59 |
|---|---|---|---|
| 3,518,674 | 6/1970 | Moorehead et al. | 343/112 |
| 3,680,121 | 7/1972 | Anderson et al. | 343/112 TC |
| 3,714,650 | 1/1973 | Fuller et al. | 343/6.5 LC |
| 3,757,290 | 9/1973 | Ross et al. | 340/23 |
| 3,789,409 | 1/1974 | Easton | 343/112 R |
| 3,848,254 | 11/1974 | Drebinger et al. | 343/112 R |
| 4,053,893 | 10/1977 | Boyer | 343/112 PT |
| 4,083,003 | 4/1978 | Haemming | 325/6 |
| 4,107,689 | 8/1978 | Jellinek | 343/112 TC |
| 4,152,693 | 5/1979 | Ashworth, Jr. | 340/24 |
| 4,177,466 | 12/1979 | Reagan | 343/112 TC |
| 4,222,052 | 9/1980 | Dunn | 343/112 R |
| 4,382,178 | 5/1983 | Mori | 377/17 |
| 4,428,052 | 1/1984 | Robinson et al. | 364/436 |
| 4,428,057 | 1/1984 | Setliff et al. | 364/521 |
| 4,435,711 | 3/1984 | Ho et al. | 343/389 |
| 4,445,118 | 4/1984 | Taylor et al. | 343/357 |

(List continued on next page.)

FOREIGN PATENT DOCUMENTS

| EP0242099 | 10/1987 | European Pat. Off. | G01S 5/14 |
|---|---|---|---|
| EP0367935 | 5/1990 | European Pat. Off. | H04Q 7/04 |
| GB2193861 | 2/1988 | United Kingdom | H04Q 7/04 |
| WO8904035 | 5/1989 | WIPO | G10L 5/06 |

OTHER PUBLICATIONS

"Trimpack" Brochure, TrimbleNavigation, date unknown, 1 page.

James C. Reynolds, et al., "GPS–Based Vessel Position Monitoring and Display System", *IEEE*, 1990, pp. 601–607.

R. DeSadaba, "Personal Communications in the Intelligent Network," *British Telecommunications Engineering*, vol. 9, Aug., 1990, pp. 80–83.

"GPS NAVSTAR Global Positioning System User's Overview—YEE–82–009D," *Navstar Global Positioning System Joint Program Office*, Mar., 1991, pp. 1–164.

"U.S. Coast Guard Differential GPS" Brochure, *U.S. Department of Transportation, United States Coast Guard*, May, 1993.

(List continued on next page.)

*Primary Examiner*—Kevin J. Teska
*Assistant Examiner*—Russell W. Frejd
*Attorney, Agent, or Firm*—Baker & Botts, L.L.P.

[57] ABSTRACT

A system (10) for determining an expected time of arrival of a vehicle (40) equipped with a mobile unit (42) includes a dispatch (20) remotely located from the vehicle (40). The dispatch (20) generates destination information for the vehicle (40), the destination information specifying at least one destination. The mobile unit (42) includes a mobile communications device (90) to receive the destination information for the vehicle (40) generated by the dispatch (20). The mobile unit (42) also includes a positioning receiver (80) to determine a vehicle position. In response to the destination information received from the dispatch (20) and the vehicle position, the mobile unit (42) determines the expected time of arrival of the vehicle.

51 Claims, 5 Drawing Sheets

U.S. PATENT DOCUMENTS

| | | | |
|---|---|---|---|
| 4,547,778 | 10/1985 | Hinkle et al. | 343/456 |
| 4,590,569 | 5/1986 | Rogoff et al. | 364/452 |
| 4,651,157 | 3/1987 | Gray et al. | 342/457 |
| 4,660,037 | 4/1987 | Nakamura | 340/990 |
| 4,688,244 | 8/1987 | Hannon et al. | 379/58 |
| 4,700,374 | 10/1987 | Bini | 379/60 |
| 4,728,959 | 3/1988 | Maloney et al. | 342/457 |
| 4,740,792 | 4/1988 | Sagey et al. | 342/457 |
| 4,742,357 | 5/1988 | Rackley | 342/457 |
| 4,750,197 | 6/1988 | Denekamp et al. | 379/58 |
| 4,754,465 | 6/1988 | Trimble | 375/1 |
| 4,774,670 | 9/1988 | Palmieri | 364/446 |
| 4,791,571 | 12/1988 | Takahashi et al. | 364/436 |
| 4,791,572 | 12/1988 | Green, III et al. | 364/449 |
| 4,799,162 | 1/1989 | Shinkawa et al. | 364/436 |
| 4,809,005 | 2/1989 | Counselman, III | 342/352 |
| 4,833,477 | 5/1989 | Tendler | 342/389 |
| 4,891,650 | 1/1990 | Sheffer | 342/457 |
| 4,897,642 | 1/1990 | DiLullo et al. | 340/825.06 |
| 4,907,290 | 3/1990 | Crompton | 455/56 |
| 4,908,629 | 3/1990 | Apsell et al. | 342/457 |
| 5,003,317 | 3/1991 | Gray et al. | 342/457 |
| 5,014,206 | 5/1991 | Scribner et al. | 364/449 |
| 5,025,253 | 6/1991 | DiLullo et al. | 340/825.06 |
| 5,032,845 | 7/1991 | Velasco | 342/457 |
| 5,043,736 | 8/1991 | Darnell et al. | 342/357 |
| 5,045,861 | 9/1991 | Duffett-Smith | 342/457 |
| 5,055,851 | 10/1991 | Sheffer | 342/457 |
| 5,068,656 | 11/1991 | Sutherland | 340/989 |
| 5,119,102 | 6/1992 | Barnard | 342/357 |
| 5,121,126 | 6/1992 | Clagett | 342/419 |
| 5,121,325 | 6/1992 | DeJonge | 364/442 |
| 5,131,019 | 7/1992 | Sheffer et al. | 379/39 |
| 5,142,281 | 8/1992 | Park | 340/991 |
| 5,155,490 | 10/1992 | Spradley, Jr. et al. | 342/357 |
| 5,166,694 | 11/1992 | Russell et al. | 342/457 |
| 5,172,321 | 12/1992 | Ghaem et al. | 364/444 |
| 5,208,756 | 5/1993 | Song | 364/449 |
| 5,223,844 | 6/1993 | Mansell et al. | 342/357 |
| 5,225,842 | 7/1993 | Brown et al. | 342/357 |
| 5,243,529 | 9/1993 | Kashiwazaki | 346/449 |
| 5,252,982 | 10/1993 | Frei | 342/357 |
| 5,270,936 | 12/1993 | Fukushima et al. | 364/444 |
| 5,293,163 | 3/1994 | Kakihara et al. | 340/995 |
| 5,299,132 | 3/1994 | Wortham | 346/460 |
| 5,317,323 | 5/1994 | Kennedy et al. | 342/457 |
| 5,323,322 | 6/1994 | Mueller et al. | 364/449 |
| 5,327,144 | 7/1994 | Stilp et al. | 342/387 |
| 5,334,974 | 8/1994 | Simms et al. | 340/990 |
| 5,365,516 | 11/1994 | Jandrell | 370/18 |
| 5,392,052 | 2/1995 | Eberwine | 342/357 |
| 5,392,458 | 2/1995 | Sasuta et al. | 455/54.1 |
| 5,396,540 | 3/1995 | Gooch | 379/59 |
| 5,400,020 | 3/1995 | Jones et al. | 340/994 |
| 5,422,816 | 6/1995 | Sprague et al. | 364/449 |
| 5,432,841 | 7/1995 | Rimer | 379/59 |
| 5,444,444 | 8/1995 | Ross | 340/994 |
| 5,463,554 | 10/1995 | Araki et al. | 364/444 |

OTHER PUBLICATIONS

"GPS Facts & Figures" Brochure, *U.S. Deptarment of Transportation*, United States Coast Guard, May, 1993.

D. H. Alsip, J. M. Butler, and J. T. Radice, "Implementation of the U.S. Coast Guard's Differential GPS Navigation Service," *U.S. Coast Guard Headquarters, Office of Navigation Safety and Waterway Services, Radionavigation Division*, Jun. 28, 1993, pp. 1–10.

Don Burtis, "CDPD—A Bandwidth Optimization Technique for Cellular Telephones," *Computer Design's OEM Integration*, May, 1994, pp. 19–20.

"U.S. Coast Guard Bulletin Board System File 'FRP–DGPS,'" *U.S. Coast Guard*, Date Unknown, pp. 1–6.

Gene L. Schlechte, LCDR, "U.S. Coast Guard Bulletin Board System Document 'DESIGN.TXT'—Design Process for the United States Coast Guard's Differential GPS Navigation Service," *U.S. Coast Guard, U.S. Coast Guard Omega Navigation System Center*, Date Unknown, pp. 1–21.

Kirk Ladendorf, "First In Flight—Using State–Of–The–Art Technology, Austin–Based Arrowsmith Technologies Establishes Itself As A Major Player In Nascent Technology–Supplier Market," *Austin American Statesman*, Jan. 30, 1995, 3 pages.

METHOD AND APPARATUS FOR DETERMINING EXPECTED TIME OF ARRIVAL

TECHNICAL FIELD OF THE INVENTION

This invention relates to a system for determining an expected time of arrival, and more particularly to a system for determining an expected time of arrival using a mobile communications network and a positioning system.

BACKGROUND OF THE INVENTION

Mobile communications technology has enjoyed substantial growth over the past decade. Many cars, trucks, airplanes, boats, and other vehicles are equipped with devices that allow convenient and reliable mobile communications using a network of satellite-based or land-based transceivers. Advances in this technology have also led to widespread use of hand-held, portable mobile communications devices.

Many customers of mobile communications systems desire an accurate determination of their expected time of arrival at a particular destination, and perhaps reporting of this time to a remote location. For example, a cellular telephone in a vehicle or carried by a person offers a convenient communication link to report expected time of arrival information. One method to determine an expected time of arrival uses the average travel time from a point of origin to a destination. This approach, however, may not be suitable for particular applications that require more accuracy and more frequent updates of an expected time of arrival.

Furthermore, transportation systems would benefit from a dispatching function that monitors and directs the travel route and expected time of arrival of its carriers. For example, dispatchers of long-haul or local vehicles desire a system that allows access to expected time of arrival information to make routing and dispatching decisions.

SUMMARY OF THE INVENTION

In accordance with the present invention, the disadvantages and problems associated with previous techniques used to determine and report the expected time of arrival of a vehicle, person, or object at a particular destination have been substantially reduced or eliminated. One aspect of the present invention provides a system for determining an expected time of arrival that integrates positioning technology with an existing mobile communications infrastructure.

According to an embodiment of the present invention, a system for determining an expected time of arrival of a vehicle equipped with a mobile unit includes a dispatch remotely located from the vehicle. The dispatch generates destination information for the vehicle, specifying at least one destination. A communications link is coupled to the dispatch and receives the destination information for the vehicle from the dispatch. The mobile unit is coupled to the communications link and receives from the communications link the destination information for the vehicle generated by the dispatch. The mobile unit determines a vehicle position and, in response to the vehicle position, also determines the expected time of arrival of the vehicle at the destination identified by the destination information.

According to another embodiment of the present invention, a method for determining an expected time of arrival of a vehicle includes generating destination information at a dispatch, specifying at least one destination and at least one appointment time. The destination information is transmitted to the vehicle. The vehicle position is determined at the vehicle. In response to the vehicle position, the expected time of arrival of the vehicle at the destination identified by the destination information is also determined at the vehicle.

Important technical features of the present invention include improving the accuracy of determining an expected time of arrival by using a positioning system. In particular, the positioning system provides information to a processor on the vehicle so that the processor may calculate the expected time of arrival based upon the actual position of the vehicle. Additionally, the expected time of arrival may be updated continuously throughout a trip. Another technical advantage includes sending information to the vehicle from a remote location, such as a dispatch. Such information may comprise one or more destinations and corresponding appointment times, route information, information regarding tasks to be performed or packages to be delivered at each destination specified, weather information, traffic updates, or other information. Other technical advantages of the present invention include generating late information when the vehicle determines it will not arrive at a destination at the corresponding appointment time. The present invention may also display this late information to the operator of the vehicle and transmit the late information to a remote location. Important technical advantages may also include reporting to the remote location that the vehicle is not being driven along a predetermined route. Other technical advantages are readily apparent to one skilled in the art from the following figures, description, and claims.

BRIEF DESCRIPTION OF THE DRAWINGS

For a more complete understanding of the present invention and for further features and advantages, reference is now made to the following description taken in conjunction with the accompanying drawing, wherein like reference numerals represent like parts, in which.

DETAILED DESCRIPTION OF THE INVENTION

Figure 1:
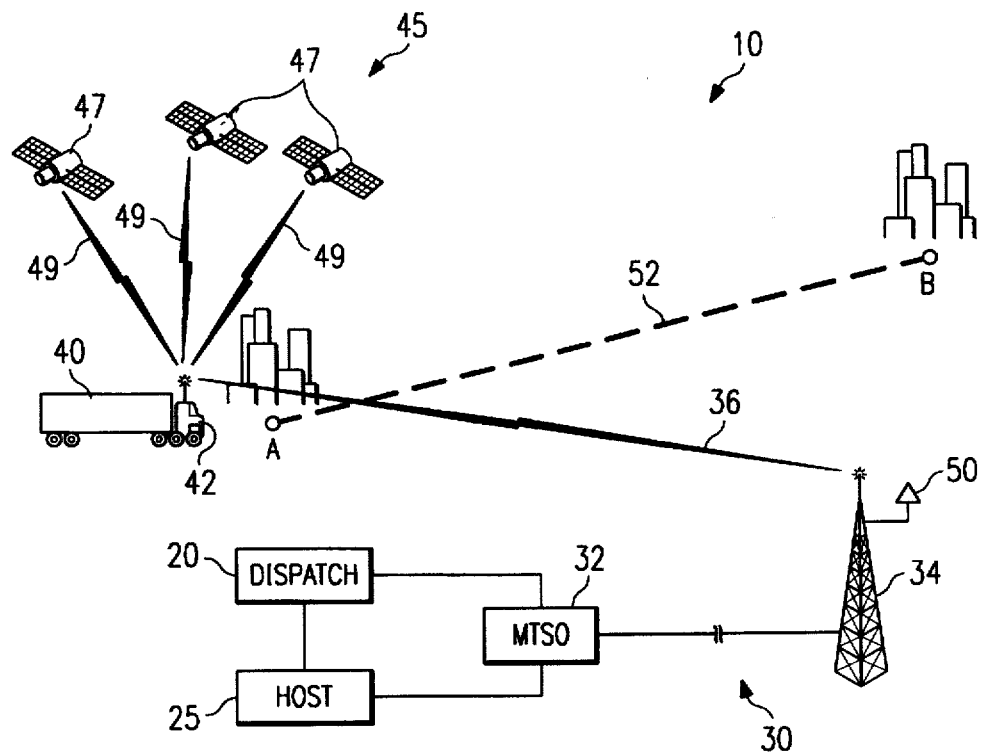
FIG. 1 illustrates a system for determining an expected time of arrival at a single destination.

FIG. 1 illustrates a system 10 for determining an expected time of arrival of a vehicle 40 travelling from a point of origin A to a destination B. System 10 includes a dispatch 20, a host 25, a communications link 30, and vehicle 40 equipped with a mobile unit 42. System 10 provides an accurate expected time of arrival for vehicle 40 at destination B.

Dispatch 20 is remotely located from vehicle 40. One function of dispatch 20 is to generate destination information for vehicle 40. Such destination information may include one or more destinations, appointment information such as a corresponding appointment time for each destination specified, routing information, information regarding tasks to be performed at each destination specified, average travel time to each destination, rush hour and traffic information, and weather information. Destination information may be any information generated by dispatch 20 that facilitates the control or monitoring of vehicle 40. As will be explained later in more detail, an important technical advantage of the present invention includes remotely sending information to vehicle 40 from dispatch 20.

System 10 may also include one or more hosts 25 remotely located from vehicle 40. In one embodiment, host 25 performs the management and control functions for one or more fleets of trucks. Therefore, system 10 may include many hosts 25 associated with trucking companies, delivery services, or other organizations with vehicles 40 equipped with mobile units 42. Host 25 generates destination information and transmits this information over a communications link to dispatch 20. Dispatch 20 collects destination information from several hosts 25 and transmits this information to vehicles 40. Therefore, dispatch 20 can generate destination information or route destination information generated by host 25. Alternatively, host 25 can transmit destination information to vehicles 40 over communications link 30. In essence, some of the functions performed by dispatch 20 may be distributed among several hosts 25. Host 25 can also receive communications, such as late information, from mobile unit 42 over communications link 30. For clarity, this description will focus primarily on the functionality of dispatch 20, but it is understood that host 25 can perform some or all of the functions performed by dispatch 20.

Communications link 30 is coupled to dispatch 20 and host 25 and allows communication between dispatch 20, host 25, and mobile unit 42 on vehicle 40. Communications link 30 may be any land-based or spaced-based communications system, such as a cellular telephone network. More specifically, communications link 30 comprises a mobile telecommunications switching office (MTSO) 32 coupled to dispatch 20 and host 25, and at least one transmitter site 34 associated with the cellular telephone network. Dispatch 20 or host 25 generates destination information and sends this information to MTSO 32. MTSO 32 routes the destination information to transmitter site 34. Transmitter site 34 then transmits the destination information to mobile unit 42 over a destination information stream 36. Destination information may be encoded using traditional data encoders, such as a modem or a dual tone multifrequency (DTMF) coder/decoder.

Communications link 30 may be one or a combination of dedicated telephone lines, switched telephone lines, microwave communications links, satellite-based communications links, specialized mobile radio (SMR), enhanced specialized mobile radio (ESMR), a personal communications service (PCS), a citizen's band (CB), a dedicated radio system, such as those used by police and fire fighters, or any other suitable communications link that allows dispatch 20 or host 25 to transmit data to or receive data from mobile unit 42. Communications link 30 may also be an SS7 backbone link or similar network for linking land-line or cellular switches in a public switched telephone network (PSTN). Such a link allows components of the PSTN to share information for validation, roaming, billing, call routing, and other functions. Communications link 30 may also include intelligence to route information generated at dispatch 20, host 25, or mobile unit 42 to multiple selected sites.

Destination information stream 36 may be implemented in a control channel, paging channel, part of a seized voice or data channel, or overhead message stream currently implemented in cellular telephone technology. Presently, the control channel provides paging of incoming calls, hand-off instructions, and other features of the cellular telephone network, but may be modified by one skilled in the art to include transmission of destination information. Destination information stream 36 may also be implemented using any other analog or digital communications link between transmitter site 34 and mobile unit 42, whether or not the communications link requires seizing of a voice or data channel, and whether or not a data encoder is used. For example, destination information stream 36 may be part of a separate channel requiring mobile unit 42 to re-tune to destination information stream 36 transmitted from transmitter site 34.

Additionally, there are several developing technologies that may provide a convenient implementation of destination information stream 36. For example, cellular digital packet data (CDPD) technology allows integration of data and voice using the existing cellular telephone infrastructure. In a CDPD system, digital packets of data and analog voice segments share the same channel. Other developments in digital cellular communications, such as code division multiple access (CDMA) and time division multiple access (TDMA), allow digital data and digital voice signals to be interspersed on a communications channel. These technologies integrate digital data transmission in a communications link 30, and therefore provide a convenient implementation scheme for destination information stream 36.

Transmitter site 34 may send destination information to mobile unit 42 in one large packet or in several smaller packets interspersed with other data used for mobile communications. For example, the destination information may be packaged in existing, but unused, bytes of the overhead message stream or in a dedicated protocol. One possible implementation would place destination information in the extended protocol described in the EIA/TIA-533 mobile communications standard, which provides for bidirectional communication between transmitter site 34 and mobile unit 42.

Mobile unit 42 may continuously monitor destination information stream 36 transmitted from transmitter site 34. Furthermore, mobile unit 42 may alternatively tune between several destination information streams 36 from several transmitter sites 34 to determine the strongest signal, usually relating to the nearest transmitter site 34.

FIG. 1 shows mobile unit 42 on vehicle 40. The present invention contemplates mobile unit 42 being carried by all types of vehicles, including cars, trucks, airplanes, boats, barges, rail cars, truck trailers, on a person's body, along with a package, or any other movable object for which it is desirable to calculate an expected time of arrival.

Because mobile unit 42 is coupled to communications link 30, mobile unit 42 can communicate with dispatch 20. Mobile unit 42 receives the destination information generated by dispatch 20 for vehicle 40 over communications link 30. In particular, mobile unit 42 contains a mobile communications device 90 (FIG. 5) that receives destination information over destination information stream 36.

Mobile unit 42 may comprise an output device 104 (FIG. 5) operable to present visually or audibly the destination information to an operator of vehicle 40 once the information has been received by mobile unit 42. For example, referring to FIG. 1, output 104 displays destination information that specifies a particular route 52 for vehicle 40 to follow from a point of origin A to a destination B. Once informed of this information, the operator may then drive along route 52.

Using a positioning system 45, mobile unit 42 determines the position of vehicle 40. Specifically, mobile unit 42 comprises a mobile positioning receiver 80 (FIG. 5) operable to receive positioning information from positioning system 45. Mobile unit 42 receives positioning information over positioning information streams 49 from a plurality of satellites 47. Mobile unit 42 then determines its position using information from positioning information streams 49. The positioning information comprises accurate satellite positioning information transmitted by satellites 47 and pseudorange data represented by the time of arrival of positioning information streams 49 to mobile unit 42.

Positioning system 45 is illustrated as a satellite-based radio navigation system, such as the NAVSTAR global positioning system (GPS). The description uses the NAVSTAR GPS as a representative positioning system 45, but any land-based or satellite-based system may be used. For example, positioning system 45 may be a land-based LORAN-C, a space-based GLONASS, a dead reckoning system, an inertial navigation system, or any other appropriate positioning technology. As shown in FIG. 1, positioning system 45 comprises a plurality of satellites 47. In general, positioning system 45 comprises a plurality of space-based or land-based transmitters that emit positioning information.

Satellites 47 maintain accurate and synchronized time and simultaneously transmit positioning information that contains satellite specific and system information required by mobile unit 42 to determine the position of vehicle 40. The positioning information transmitted by satellites 47 may include high precision clock and ephemeris data for a particular satellite, low precision clock and ephemeris data for every satellite in a constellation ("almanac data"), health and configuration status for all satellites, user text messages, and other parameters describing operation of positioning system 45.

Positioning system 45 may also comprise additional satellites and one or more positioning receivers. The additional satellites may also communicate positioning information to mobile unit 42. In one embodiment, a positioning receiver 50 may be mounted on transmitter site 34 to implement differential GPS techniques. Positioning receiver 50 generates correction data that enables mobile unit 42 to more accurately determine the position of vehicle 40. Positioning receiver 50 transmits the correction data to mobile unit 42 over any suitable link, such as destination information stream 36.

In response to the vehicle position, mobile unit 42 determines the expected time of arrival of vehicle 40 at the destination identified by the destination information received from dispatch 20 over communications link 30. In calculating the expected time of arrival, mobile unit 42 may also consider such factors as the expected average speed of vehicle 40, the actual average speed of vehicle 40, the time of day during which vehicle 40 is traveling, the average time of a trip from origin A to destination B along route 52 based upon prior travel, weather conditions, and other information impacting the expected time of arrival calculation. Stationary intervals along the route may also impact the calculation of expected time of arrival. These stationary intervals may include mandatory driver rest periods, allocated time to perform tasks at a location, overnight stays, scheduled or unscheduled maintenance, weigh-ins, or other intervals when vehicle 40 is not moving. The factors used to calculate expected time of arrival may be provided to mobile unit 42 from dispatch 20 or generated locally at vehicle 40. For example, mobile unit 42 may factor in delays due to weather conditions or mandatory driver rest periods that dispatch 20 is unable to predict.

Dispatch 20 can configure the interval of time between calculations of expected time of arrival by mobile unit 42. The calculation of expected time of arrival may also be continuous. As discussed below, this interval of time dictates how quickly dispatch 20 will be informed that vehicle 40 may be late in arriving at a particular destination. Furthermore, mobile unit 42 may transmit information on expected time of arrival even if it is determined that vehicle 40 will be on-time at the destination. For example, vehicle 40 may want to report to dispatch 20 a calculated expected time of arrival that is much earlier than the corresponding appointment time. In general, mobile unit 42 may initiate transmission of information to dispatch 20 based on calculation of late arrival, calculation of early arrival, a predetermined reporting interval, or other condition.

System 10 provides a more accurate estimate for expected time of arrival than currently available systems, and may provide these estimates near instantaneously or "on the fly." These estimates may consider the specifics of each trip, such as traffic, weather conditions, and the time of day during which vehicle 40 travels. In some applications, low frequency and low accuracy updates are sufficient. Other applications, however, require greater accuracy and higher frequency updates in near real-time. For example, the operator of a local delivery truck may require accurate, high frequency estimates of expected time of arrival to monitor scheduled activities. System 10 provides these high frequency updates without relying on off-vehicle computations. In addition, the same delivery truck may send lower frequency estimates of expected time of arrival or late information to a remote location, such as dispatch 20. These estimates may be sent at fixed time intervals, on-demand, or as a result of a predetermined reporting event.

System 10 supports the remote sending of destination information to vehicle 40 from dispatch 20. If destination information is only input into mobile unit 42 just prior to departure of vehicle 40 from its origin, mobile unit 42 only has available destination information that is current as of the moment of departure. Over a long-haul trucking route or an extended local delivery route, destination information may become outdated before vehicle 40 reaches its final destination. To remedy this problem, dispatch 20 can continuously update the destination information used by mobile unit 42 to calculate the expected time of arrival of vehicle 40 at one or more destinations. For example, at the moment of departure, destination information input into mobile unit 42 may include the preferred route for vehicle 40 and several destinations with corresponding appointment times. During the trip, the preferred route may be shut down, additional destinations and corresponding appointment times may be added to the route, existing destinations and appointment times may be modified or deleted, traffic and truck conditions may change, or any other event may compel dispatch 20 to send updated destination information to vehicle 40.

Furthermore, destination information is sent directly to mobile unit 42, rather than input by the operator of vehicle 40. Since the operator of vehicle 40 is not distracted from his main duty of driving vehicle 40, the risk of vehicle 40 being involved in an accident is reduced. Furthermore, any human error in inputting destination information into mobile unit 42 is substantially reduced.

Mobile unit 42 may also be configured to notify both dispatch 20 and an operator of vehicle 40 if there is a likelihood that vehicle 40 will be late in arriving at a destination. After mobile unit 42 has determined the expected time of arrival, mobile unit 42 compares this time to a corresponding appointment time specified in the destination information. If the expected time of arrival for vehicle 40 at the destination is later than the appointment time, mobile unit 42 generates late information that may include the expected time of arrival. The interval of time between expected time of arrival calculations dictates the accuracy of the late information. If the expected time of arrival is calculated more often, then dispatch 20 and the operator will more likely be notified sooner that vehicle 40 will be late. For example, suppose the interval between calculations is one hour. Further suppose that vehicle 40 breaks down just after mobile unit 42 has calculated an expected time of arrival. In this case, mobile unit 42 will not generate late information informing dispatch 20 that vehicle 40 will likely be late until almost a full hour has passed. Suppose, however, that the interval between calculations is fifteen minutes. In this case, dispatch 20 is informed sooner that vehicle 40 will probably be late.

The generation of late information is also configurable in several ways. Late information does not need to be generated in all instances where mobile unit 42 calculates the expected time of arrival to be later than the corresponding appointment time at a destination. For example, in most cases dispatch 20 should not be alerted if vehicle 40 will arrive at a destination one minute after the appointment time. Thus, dispatch 20 is operable to configure a delta time parameter, defined as the difference between the appointment time and a later expected time of arrival, based upon the importance of vehicle 40 arriving at a destination on or before the appointment time. Also, just because mobile unit 42 determines that the expected time of arrival of vehicle 40 is later than the appointment time after one calculation does not mean that vehicle 40 will definitely be late. Vehicle 40 may not be behind schedule the next time that mobile unit 42 calculates the expected time of arrival. Thus, dispatch 20 is operable to configure a failure count parameter, defined as the number of calculations of expected times of arrival in a row that are later than the appointment time. For instance, under a failure count of zero, late information will be sent to dispatch 20 the first time mobile unit 42 calculates that the expected time of arrival is later than the appointment time. Furthermore, dispatch 20 does not need to be notified continuously once vehicle 40 has fallen behind schedule. Rather, mobile unit 42 should only renotify dispatch 20 at intervals. Thus, a renotification interval parameter is configurable based upon how often dispatch 20 needs to be informed that vehicle 40 will probably be late. The delta time parameter, failure count parameter, renotification interval parameter, and other operating parameters can be sent from dispatch 20 to vehicle 40 as destination information.

Figure 5:
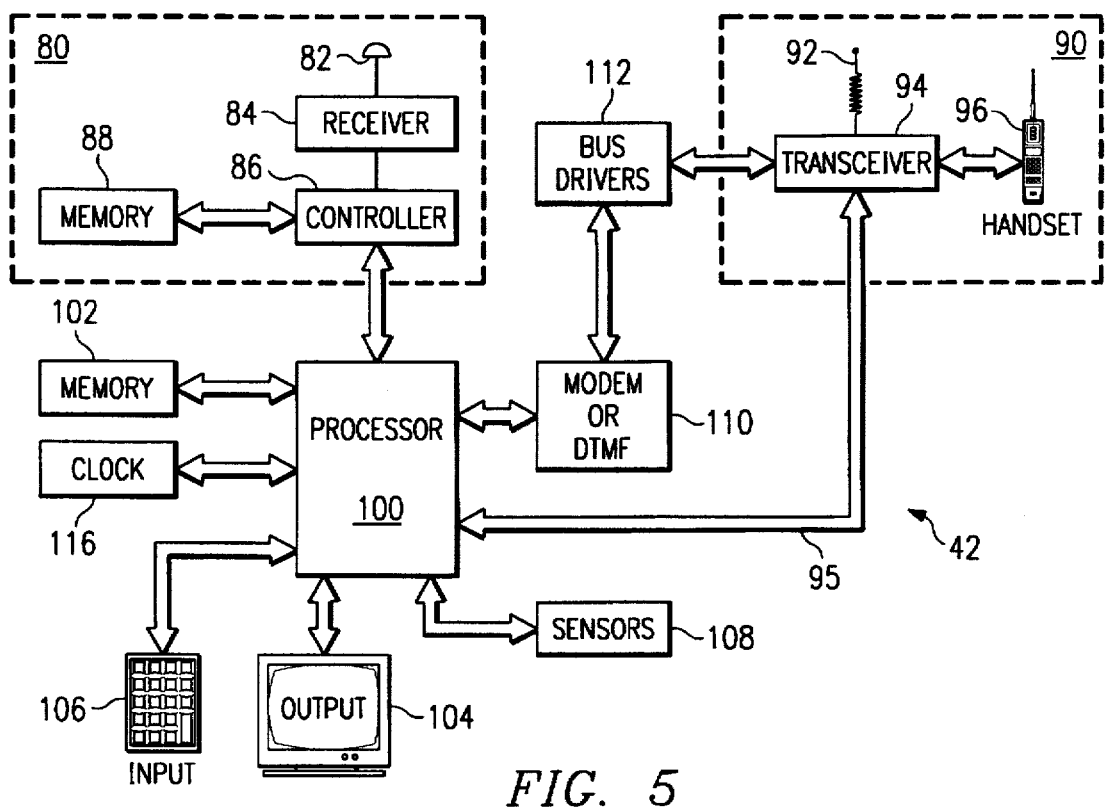
FIG. 5 is a schematic representation of a mobile unit.

System 10 allows parties to adjust for a late arrival. Mobile unit 42 transmits the late information to dispatch 20 over communications link 30. Dispatch 20 may then act upon the late information. For example, dispatch 20 may inform parties at the destination that vehicle 40 will not make the appointment time, but rather will arrive at the expected time of arrival determined by mobile unit 42. Mobile unit 42 may also transmit late information directly to the destination of vehicle 40. Furthermore, mobile unit 42 may present the late information to the operator of vehicle 40 via output 104 (FIG. 5). Once informed that vehicle 42 will not arrive at the destination at the corresponding appointment time, the operator may take corrective action, such as making less stops. Additionally, mobile unit 42 may be configured to determine and display the average speed of travel required of vehicle 40 to arrive at the destination at the appointment time.

Mobile unit 42 can be configured to generate late information only if the expected time of arrival at the destination is later than the corresponding appointment time. Other systems that are used for monitoring vehicles provide constant updates on the vehicles. Most dispatchers, however, are not concerned about the exact position of a vehicle at every moment in route to its destination. Rather, dispatchers may be concerned only when a vehicle cannot reach its destination at the appointed time. In such a manner, mobile unit 42 substantially reduces or eliminates the expense of additional personnel, equipment, and communications costs needed to monitor vehicle 40.

In system 10, dispatch 20 allows monitoring of at least one vehicle 40 equipped with mobile unit 42. A large company may operate dispatch 20 to monitor a plurality of vehicles 40 equipped with mobile units 42. Smaller companies with more limited resources could pool together to either jointly operate dispatch 20 or employ an independent firm to operate dispatch 20. It should be understood that the present invention contemplates any number and arrangement of dispatches 20 to monitor one or more fleets of vehicles 40.

Figure 2:
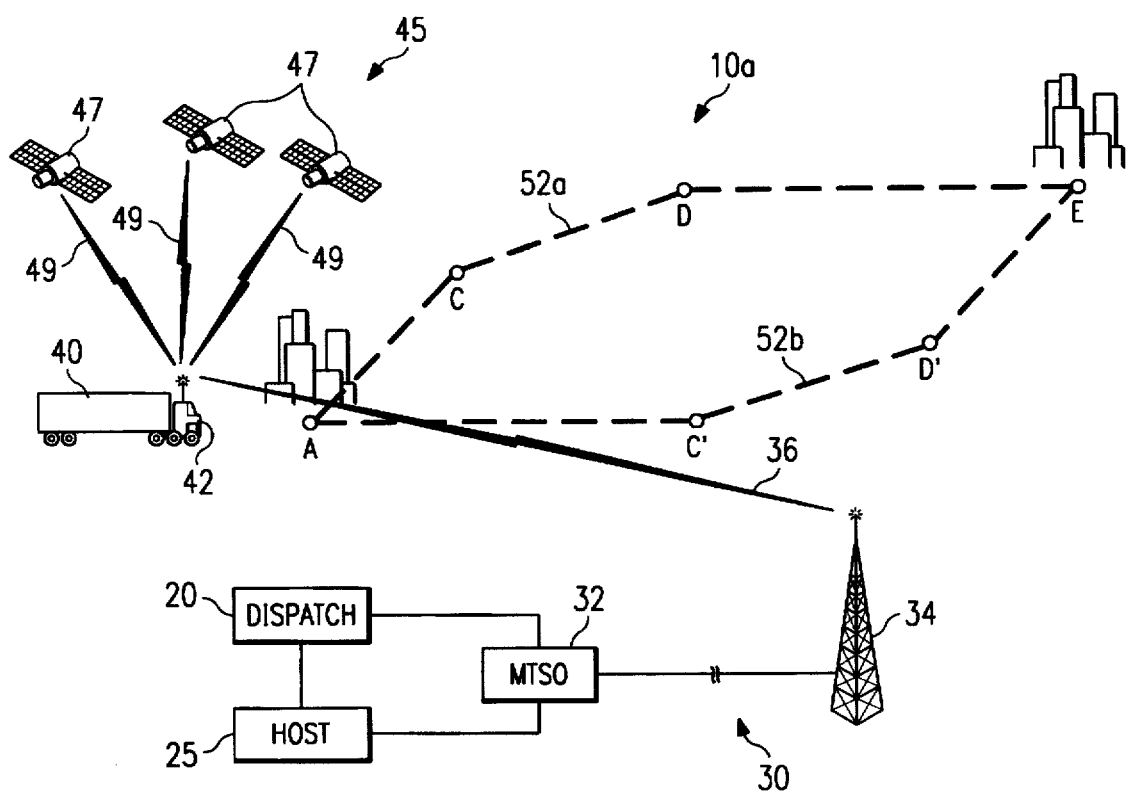
FIG. 2 illustrates a system for determining expected times of arrival at a plurality of destinations.

FIG. 2 illustrates a system 10a for determining expected times of arrival at a plurality of destinations. More particularly, system 10a as shown provides accurate expected times of arrival for vehicle 40 at destinations C, D, and E along route 52a or destinations C', D', and E along route 52b.

In this embodiment of the present invention, the destination information generated by dispatch 20 includes several destinations and corresponding appointment times. For example, the destination information may specify that vehicle 40 must be at: (1) destination C at 1:00 p.m., Feb. 1, 1995; (2) destination D at 4:00 p.m., Feb. 1, 1995; and (3) destination E at 10:00 a.m., Feb. 2, 1995. Based upon this and other destination information received from dispatch 20 over communications link 30 and from positioning information received from positioning system 45, mobile unit 42 determines the expected times of arrival of vehicle 40 at destinations C, D, and E.

The operator of vehicle 40 may be required to perform some task, such as dropping off a delivery, at each of destinations C, D, and E. Vehicle 40 is scheduled to arrive at each destination by the corresponding appointment time specified in the destination information; otherwise, mobile unit 42 generates late information for each destination that vehicle 40 will not reach by the corresponding appointment time. For example, assume vehicle 40 arrived at the appointed time at destination C, but is now running late by an hour for destination D. Based on current vehicle position and other factors, mobile unit 42 determines the expected time of arrival at destination D and may also determine an expected time of arrival at destination E. If one or both of these expected times of arrival are after the corresponding appointment time, then mobile unit 42 generates late information for display to the operator and/or transmission to dispatch 20. Dispatch 20 may then inform parties at destinations D and E that vehicle 40 will arrive at the expected times of arrival determined by mobile unit 42 for those destinations.

A problem that trucking companies have often faced is that operators of trucks, either intentionally or unintentionally, drive considerable distances from their assigned routes. Because trucking companies must pay for the additional fuel and maintenance expenses associated with the increased mileage, these out-of-route miles are extremely costly to trucking companies. To alleviate this problem, destinations C and D may be used as way points to determine whether the operator of vehicle 40 has driven out of route 52a specified in the destination information generated by dispatch 20. Referring to FIG. 2, dispatch 20 generates destination information specifying that vehicle 40 is to proceed to destination E along route 52a, thus passing through way points C and D.

Mobile unit 42 may be configured to update dispatch 20 when vehicle 40 has reached a way point. In this way, dispatch 20 may be notified that vehicle 40 is still in route. Suppose, however, that instead of following route 52a specified by the destination information, the operator of vehicle 40 drives along route 52b passing through points C' and D'. Based upon the position information received from positioning system 45 and the destination information received from dispatch 20, mobile unit 42 determines that the expected time of arrival of vehicle 40 at way point C will be later than the corresponding appointment time. This will occur at some point along the path between A and C', and most likely at the beginning of the path near A. Therefore, shortly after vehicle 40 takes the wrong route, mobile unit 42 generates late information, including the position of vehicle 40, to inform dispatch 20 and the operator of vehicle 40 of the out-of-route condition. Regardless of the operator's intentions, he may now correct his route in order to minimize the out-of-route mileage. At this point, dispatch 20 may update the destination information for mobile unit 42.

Besides reducing out-of-route mileage, the use of intermediate way points improves the calculation of expected time of arrival. Specifically, the actual distance between the position of vehicle 40 and the destination may not be the road distance. Way points may be used as intermediate points between the position of vehicle 40 and the destination in order to more accurately calculate actual road distance. If used for more accurate distance calculation, way points do not need an associated appointment time and mobile unit 42 need not calculate an expected time of arrival at these way points. Way points may be generated locally at mobile unit 42 using, for example, routing software or databases.

Figure 3:
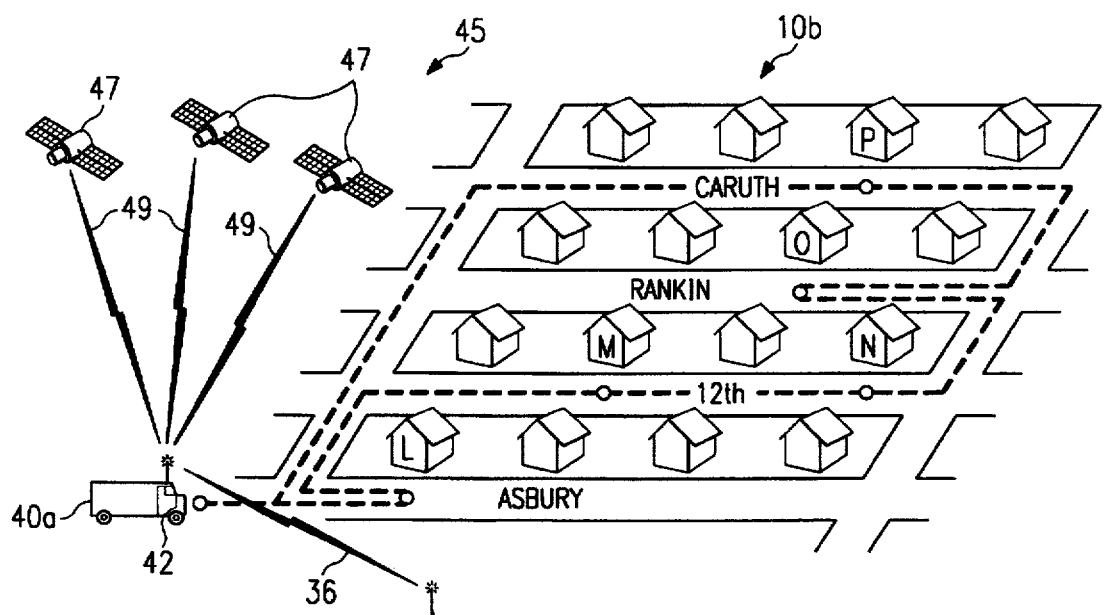
FIG. 3 illustrates an alternative embodiment of the system for determining expected times of arrival at a plurality of destinations.

FIG. 3 illustrates an alternative embodiment of system 10a for determining expected times of arrival at a plurality of destinations, with particular application to local delivery or repair services. System 10b provides expected times of arrival for vehicle 40a at destinations L, M, N, O, and P, which define the expected route of vehicle 40a shown by the dotted line. Mobile unit 42 receives destination information generated by dispatch 20 through communications link 30. The operation of system 10b illustrated in FIG. 3 is best understood in reference to both FIGS. 3 and 4.

Figure 4:
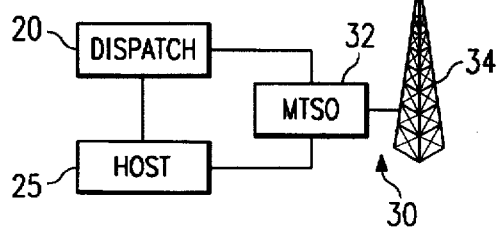
FIG. 4 illustrates a display on a vehicle.

FIG. 4 illustrates a display 60 on vehicle 40a. Address column 64 includes at least one destination, appointment time column 66 includes at least one corresponding appointment time, and description column 68 includes at least one task to be performed at a destination. The letters in parentheses under column 62, not included in display 60, disclose the corresponding destinations in FIG. 3. Specifically, lines 1, 2, 3, and 4 in display 60 of FIG. 4 correspond to destinations M, N, O, and P, respectively, shown in FIG. 3. In addition, expected time column 69 displays at least one expected time of arrival calculated by mobile unit 42. Display 60 may also display a map 67 showing the location of vehicle 40a relative to one or more destinations, a predetermined route for vehicle 40a to follow, and any other information that may be useful to the operator.

In operation, dispatch 20 generates destination information for vehicle 40a. The destination information defines, for example, the delivery schedule for a local delivery service or an appointment schedule for a local service provider. The destination information may be based in part on an allocated amount of time to perform a task at a destination and the expected travel time between destinations. For example, dispatch 20 may allocate fifty-five minutes to repair a machine at destination M and five minutes to travel between destinations M and N. Thus, as shown on line 2 of display 60 in FIG. 4, dispatch 20 generates destination information for vehicle 40a that includes an appointment time of 9:00 a.m. at destination N by adding fifty-five minutes work time plus five minutes travel time to the 8:00 a.m. appointment time at destination M.

Dispatch 20 transmits the destination information to vehicle 40a over communications link 30. Destination information may also be loaded into mobile unit 42 using any suitable input device, such as a keyboard, a direct connection, or any suitable removable storage media.

In a particular example, the operator of vehicle 40a is a plumber who is at destination M, shown on line 1 of display 60. Destination N, shown on line 2 of display 60, is five minutes away from destination M, the time is now 9:10 a.m., and the operator has just finished repairing the machine, as shown under description column 68 of line 1. Mobile unit 42 determines the expected time of arrival of vehicle 40a at destination N to be 9:15 a.m. (as shown in expected time column 69 of line 2), based upon the destination information and the vehicle position. The appointment time for destination N, however, is 9:00 a.m. (as shown in appointment time column 66 of line 2). The late expected time of arrival is displayed to the operator, which may be highlighted, blinking, or in a different color to alert the operator. Moreover, mobile unit 42 has calculated the expected times of arrival at destinations O and P to be 10:45 a.m. and 11:45 a.m., respectively, (as shown in expected time column 69 of lines 3 and 4, respectively) based upon the estimated late arrival at destination N.

Mobile unit 42 generates late information and transmits it to dispatch 20. Dispatch 20 may inform the party at destination N that vehicle 40a will be late, or the operator of vehicle 40a may do so over mobile communications device 90 (FIG. 5). Dispatch 20 may modify the route for vehicle 40a in response to receiving late information, and transmit new destination information with updated routing information and appointment information.

FIG. 5 is a schematic representation of mobile unit 42. Mobile unit 42 includes mobile positioning receiver 80, mobile communications device 90, and other associated hardware and software, described below. Mobile positioning receiver 80 includes antenna 82, receiver 84, controller 86, and memory 88. In operation, mobile positioning receiver 80 receives positioning information from satellites 47 over positioning information streams 49 at antenna 82. Receiver 84 processes the positioning information to extract ephemeris, almanac, and clock correction data. Controller 86 receives the positioning information and computes a vehicle position. These calculations performed by controller 86 may use data stored in memory 88.

Mobile communications device 90 includes antenna 92, transceiver 94, and handset 96. In operation, mobile communications device 90 receives destination information at antenna 92 over destination information stream 36. The destination information may be transmitted from dispatch 20 through communications link 30. More particularly, mobile communications device 90 receives destination information over destination information stream 36 transmitted from transmitter site 34 associated with the cellular telephone network. As described above, the destination information may be in a variety of forms, including one or more destinations, appointment information such as corresponding appointment times, routing information, weather information, average travel time between destinations, tasks to be performed at each destination, operating parameters, and other information. Destination information received by transceiver 94 may be passed to processor 100 over a link 95 or over any other appropriate path, such as through bus drivers 112 and a modem or dual tone multifrequency (DTMF) coder/decoder 110. Handset 96 provides traditional voice or data communications using mobile communications device 90.

Processor 100 manages the communicating, calculating, locating, and reporting features of mobile unit 42. In operation, processor 100 receives a vehicle position from controller 86 and destination information from transceiver 94. Processor 100 generates an expected time of arrival for vehicle 40 at a particular destination based on the vehicle position and the destination information.

Coupled to processor 100 is memory 102 which may contain programs, maps, databases, and other information required by processor 100 to perform its functions. Memory 102 may be random access memory (RAM), read-only memory (ROM), CD-ROM, removable memory devices, or any other device that allows storage or retrieval of data. Processor 100 and controller 86, as well as memory 102 and memory 88, may be separate or integral components of mobile unit 42. Mobile unit 42 contemplates any arrangement, processing capability, or task assignment between mobile positioning receiver 80, mobile communications device 90, and processor 100.

The expected time of arrival is sent to output device 104, such as display 60 in FIG. 4, to generate a table of destinations and corresponding expected times of arrival or, alternatively, a map displaying vehicle 40 and the destinations. Output device 104 also produces audible information, such as expected time of arrival updates or a late announcement, to the operator of vehicle 40.

Processor 100 is also coupled to input device 106, which may be a keypad or touch screen, as well as voice recognition software and hardware that can accept audible commands and information. Furthermore, both output device 104 and input device 106 may include fixed or removable storage media, such as magnetic computer discs, CD-ROM, or other suitable media to both receive output from and provide input to processor 100 or memory 102. Destination information may be provided to mobile unit 42 using input device 106. This can be accomplished by a direct connection with dispatch 20, audible or keypad input, or through removable storage media.

A feature of the present invention is that the operator of vehicle 40 may input information into mobile unit 42 when vehicle 40 is at one of its destinations. Using input device 106, the operator logs information about the load of vehicle 40, the weight of vehicle 40, the bill of lading, and any other item for which it is desirable to have a record. The operator may also enter the position of the particular destination based upon the position of vehicle 40 determined by mobile positioning receiver 80. The position of the destination may be stored in memory 102 along with an identification of that destination. Dispatch 20 can then use the accurate position information for that destination in generating destination information for future trips. Also on future trips, mobile unit 42 can use this position information to more accurately calculate an expected time of arrival for that destination.

Figure 6:
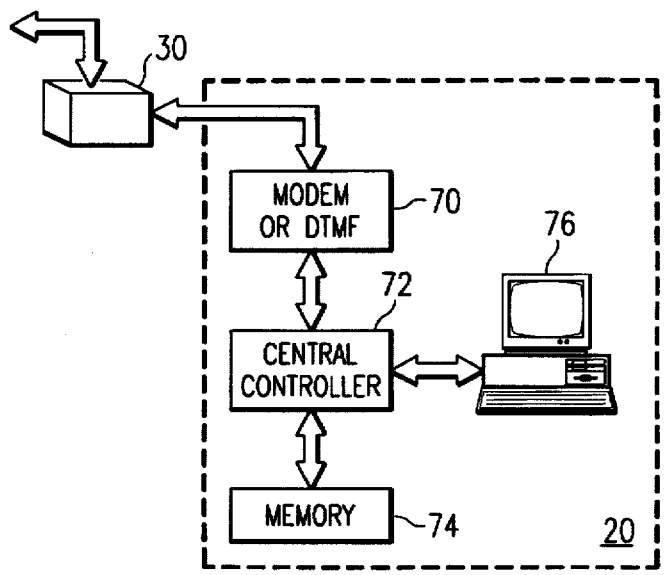
FIG. 6 is a schematic representation of a dispatch.

Processor 100 generates information for transmission to dispatch 20 using mobile communications device 90. The information may include late information, such as the expected time of arrival of vehicle 40 at a particular destination, the time of reporting, and the vehicle position, or information input by the vehicle operator, as well as any other information collected by processor 100 from various sensors 108. For example, sensors 108 may include various engine sensors, truck trailer sensors, security monitors, or other devices generating information on the status or condition of mobile unit 42, vehicle 40, or its operator. The generation and transmission of this information may be based on a late expected time of arrival, an elapsed time, movement of mobile unit 42, sensor readings, or any other piece of information that may necessitate reporting to a remote location. The information is sent from processor 100 through modem or DTMF coder/decoder 110 to bus drivers 112, and then to transceiver 94 for transmission over antenna 92 to a remote location, such as dispatch 20 (FIG. 6). Information may also be sent directly to transceiver 94 over link 95. Mobile unit 42 may also include a clock 116 coupled to processor 100 that may be used to synchronize the vehicle position received from controller 86 with destination information received from transceiver 94.

Components of mobile unit 42 shown in FIG. 5 may be packaged into one or more housings. Mobile unit 42 may be mounted to vehicle 40 or an object to be tracked. Mobile unit 42 may also be packaged as a portable, hand-held device that provides personal timing, locating, communicating, and reporting functions. For example, a portable, hand-held mobile unit 42 may be used by police, fire fighters, rescue teams, service and delivery personnel, individuals that may change forms of transportation, or in any other application requiring portability of mobile unit 42.

FIG. 6 is a schematic representation of dispatch 20. Dispatch 20 includes a modem or DTMF coder/decoder 70, a central controller 72, a memory 74, an input/output device 76, and other associated hardware and software. Memory 74 may be RAM, ROM, CD-ROM, removable memory devices, or any other device that allows storage or retrieval of data. Input/output device 76 includes any variety of output devices, such as a display, a speaker to provide audible information, removable storage media, or any other appropriate output device. Input/output device 76 may also include a variety of input devices, such as a keyboard, mouse, touch screen, removable storage media, or any other appropriate input device.

Dispatch 20 generates destination information for one or more vehicles 40 carrying mobile units 42. In particular, destination information may be input into central controller 72 by a person manually using input/output device 76, by removable storage media, such as magnetic computer discs or CD-ROM, or any other suitable means to input information into central controller 72. The destination information may include one or more destinations, corresponding appointment times for each destination, predetermined routes, average travel times from one destination to another, tasks to be performed at each destination, operating parameters, and other information. The destination information is sent from central controller 72 through modem or DTMF coder/decoder 70 to communications link 30 for transmission by transmitter site 34 to mobile unit 42.

Alternatively, transmission of destination information from dispatch 20 may not require a data encoder.

Central controller 72 also receives information from mobile unit 42 and processes this information to determine expected time of arrival, locate, track, dispatch, and communicate with mobile unit 42. For example, central controller 72 can maintain a database in memory 74 of all mobile units 42 with their current expected times of arrival, location, status, and relevant sensor readings. This database can also be used to initiate communication with mobile unit 42. Furthermore, central controller 72 may perform a call delivery function that routes incoming calls to mobile unit 42 through communications link 30.

Figure 7:
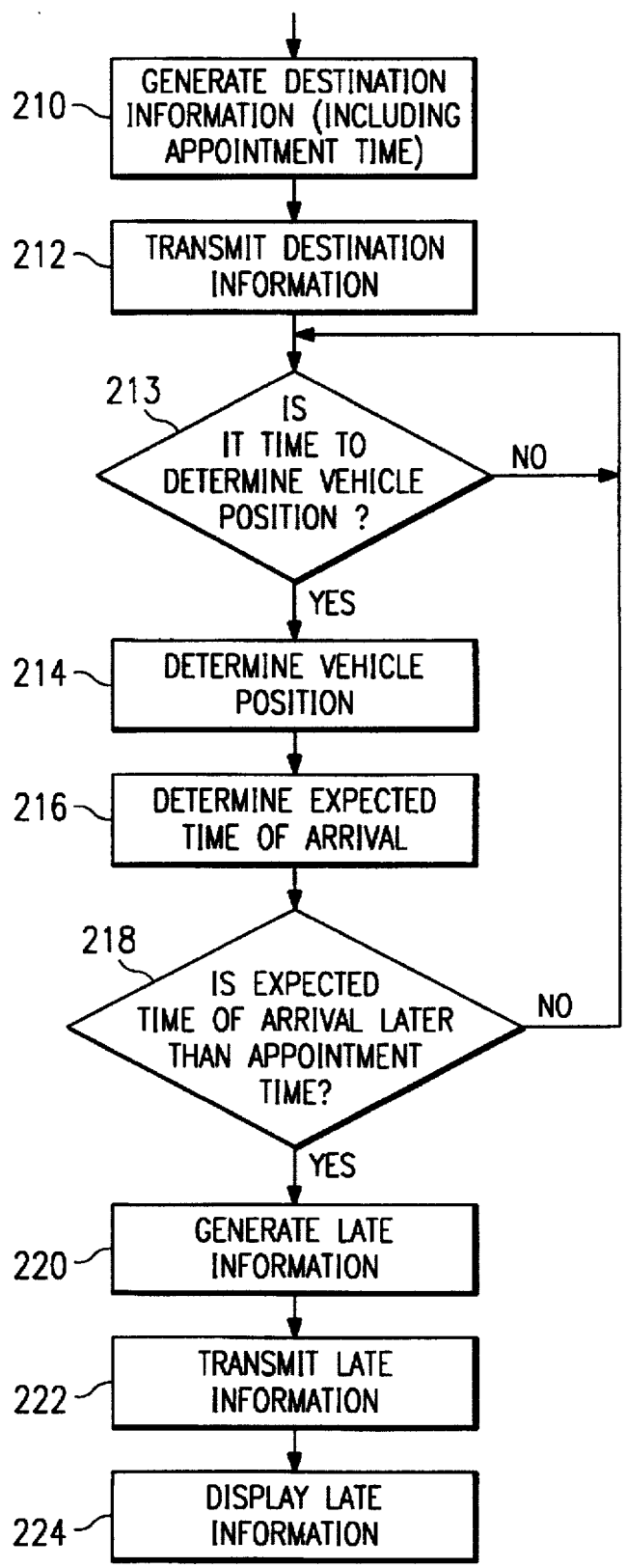
FIG. 7 is a flow chart for determining an expected time of arrival at a single destination.

FIG. 7 is a flow chart for determining an expected time of arrival at a single destination. Initially, central controller 72 of dispatch 20 generates destination information (at 210), comprising a destination and corresponding appointment time, for vehicle 40 carrying mobile unit 42. The destination can be in a variety of forms, such as latitude/longitude, as well as a street address, town or city identifier, highway crossing, or other geographic monument or identifier that can be correlated with a latitude/longitude or other positional coordinate used by mobile positioning receiver 80. The destination information is sent from central controller 72 through modem or DTMF coder/decoder 70 to communications link 30, which transmits the destination information (at 212) to mobile unit 42 on vehicle 40. Mobile unit 42 receives the destination information via mobile communications device 90. Receiver 84 of mobile positioning receiver 80 processes positioning information received from satellites 47, and controller 86 determines a vehicle position (at 214).

Processor 100 receives the destination information from mobile communications device 90 and the vehicle position from mobile positioning receiver 80. Based upon this information and other information that may be contained within memory 102, processor 100 determines the expected time of arrival (at 216) of vehicle 40 at the destination specified in the destination information.

Processor 100 next determines (at 218) whether the expected time of arrival is later than the appointment time specified in the destination information received from dispatch 20. If the expected time of arrival is not later than the appointment time, mobile unit 42 will return to the step of determining vehicle position (at 214).

If the expected time of arrival is later than the appointment time, processor 100 generates late information (at 220). Processor 100 transmits the late information (at 222) to dispatch 20 using mobile communications device 90 and communications link 30. Processor 100 also displays late information (at 224) on vehicle 40 using output device 104 to inform the operator.

Figure 8:
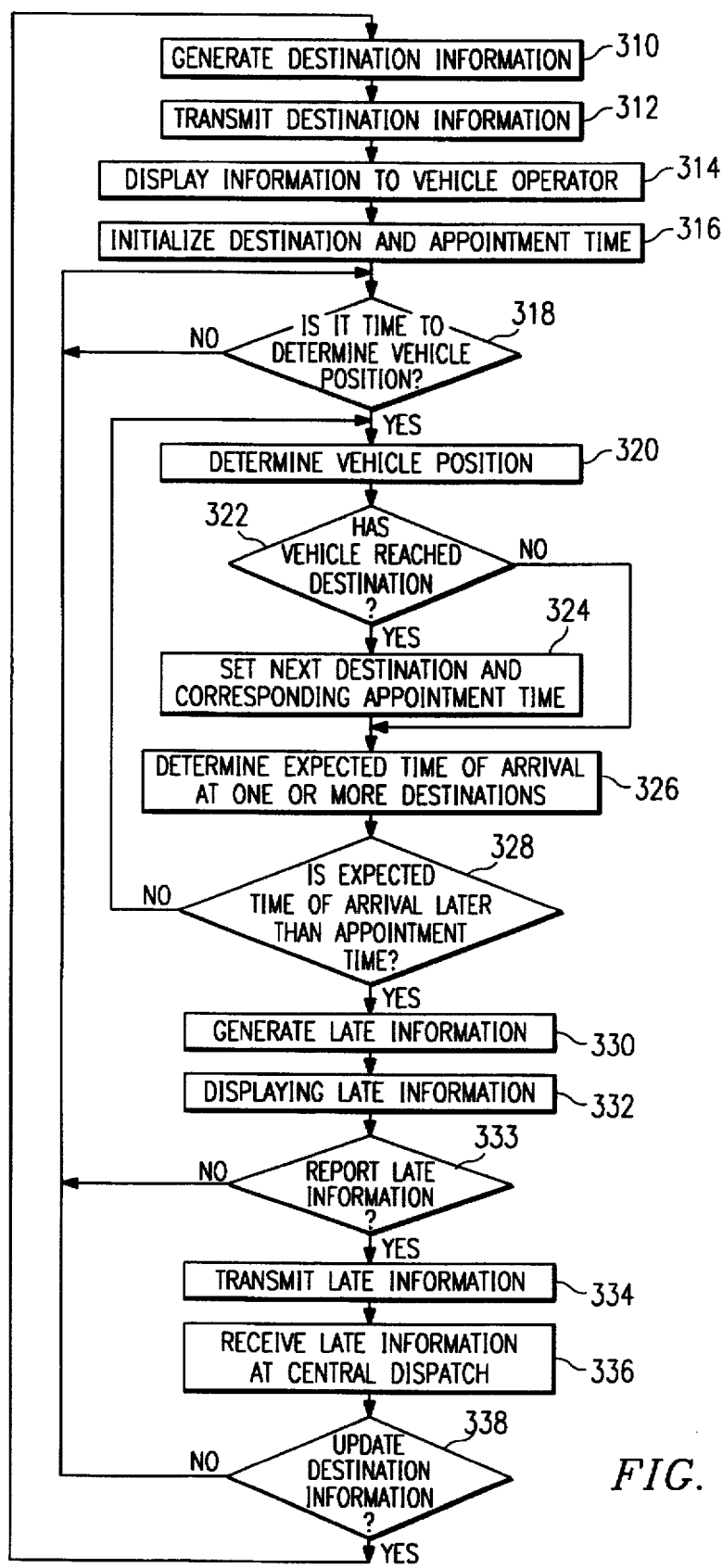
FIG. 8 is a flow chart for determining expected times of arrival at a plurality of destinations.

FIG. 8 is a flow chart for determining expected times of arrival at a plurality of destinations. Initially, central controller 72 of dispatch 20 generates destination information (at 310), comprising at least two destinations and corresponding appointment times, for vehicle 40 equipped with mobile unit 42. The destination information is sent from central controller 72 through modem or DTMF coder/decoder 70 to communications link 30, which transmits the destination information (at 312) to mobile unit 42 on vehicle 40. Mobile unit 42 receives the destination information via mobile communications device 90.

Processor 100 receives the destination information from mobile communications device 90. Processor 100 displays this information to the operator of vehicle 40 (at 314) using output device 104. Using the destination information, processor 100 initializes a destination and an appointment time (at 316) and resets a late flag (at 318). Receiver 84 of mobile positioning receiver 80 processes positioning information received from satellites 47, and controller 86 determines a vehicle position (at 320).

Processor 100 receives the vehicle position from mobile positioning receiver 80. By comparing the vehicle position to the destination, processor 100 determines whether vehicle 40 has reached the destination (at 322). If vehicle 40 has reached the destination, processor 100 sets the next destination and corresponding appointment time (at 324) specified in the destination information received from dispatch 20. If vehicle 40 has not reached the destination, processor 100 skips the step (at 324) of setting the next destination and corresponding appointment time. Based upon the vehicle position, the destination information, and other information that may be contained within memory 102, processor 100 determines an expected time of arrival (at 326) of vehicle 40 at one or more destinations. Processor 100 may generate multiple expected times of arrival for multiple destinations based on the current vehicle position.

Processor 100 next determines (at 328) whether the expected time of arrival is later than the corresponding appointment time. If the expected time of arrival is not later than the appointment time, mobile unit 42 will return to the step of determining vehicle position (at 320). If the expected time of arrival is later than the appointment time, processor 100 generates late information (at 330). Processor 100 displays late information (at 332) on vehicle 40 using output device 104 to inform the operator. Late information may be generated if any of the multiple expected times of arrival are later than their corresponding appointment times.

Processor 100 next determines (at 333) whether it should report the late information to dispatch 20, based upon a number of configurable operating parameters, such as the delta time parameter, failure count parameters, and renotification interval parameters. If late information is not reported, processor 100 returns to the step of resetting the late flag (at 318). If late information is reported, processor 100 transmits the late information (at 334) to dispatch 20 using mobile communications device 90 and communications link 30.

Dispatch 20 receives late information from mobile unit 42 (at 336) through communications link 30. Late information enters dispatch 20 through modem or DTMF coder/decoder 70 and passes to central controller 72. Central controller 72 may decide to update the destination information (at 338) and return to the step of generating destination information (at 310). If central controller 72 does not update the destination information, mobile unit 42 resets the late flag (at 318), either autonomously or in response to a signal from dispatch 20. The method continues by determining the vehicle position (at 320).

Although the present invention has been described with several embodiments, various changes and modifications may be suggested to one skilled in the art, and it is intended that the present invention encompass such changes and modifications as fall within the scope of the appended claims.

What is claimed is:

1. A system for determining an expected time of arrival of a vehicle equipped with a mobile unit, comprising:

a dispatch remotely located from the vehicle, the dispatch operable to generate destination information for the vehicle, the destination information specifying at least one destination and a corresponding appointment time;

a communications link coupled to the dispatch, the communications link operable to receive the destination information for the vehicle from the dispatch; and the mobile unit coupled to the communications link, the mobile unit operable to receive from the communications link the destination information for the vehicle generated by the dispatch, the mobile unit further operable to determine a vehicle position, the mobile unit further operable to determine in response to the vehicle position the expected time of arrival of the vehicle at the destination identified by the destination information, the mobile unit further operable to determine if the expected time of arrival differs from the corresponding appointment time for the destination by more than a predetermined amount.

2. The system of claim 1, wherein the communications link comprises a cellular telephone network.

3. The system of claim 1, wherein the destination information comprises routing information, the routing information specifying a predetermined route for the vehicle to travel to the destination, the mobile unit further operable to determine the expected time of arrival of the vehicle in response to the routing information.

4. The system of claim 1, wherein the destination information comprises routing information, the routing information specifying a predetermined route for the vehicle to travel to the destination and an expected travel speed along the predetermined route, the mobile unit further operable to determine the expected time of arrival of the vehicle in response to the routing information.

5. The system of claim 1, wherein the mobile unit comprises a GPS receiver to determine the vehicle position for use in determining the expected time of arrival.

6. The system of claim 1, wherein the mobile unit is further operable to generate late information if the expected time of arrival differs from the appointment time by more than a predetermined amount.

7. The system of claim 6, wherein the mobile unit is further operable to transmit the late information to the dispatch using the communications link.

8. The system of claim 6, wherein the late information specifies the expected time of arrival of the vehicle determined by the mobile unit.

9. The system of claim 6, wherein the mobile unit is further operable to display a late message on the vehicle in response to the late information.

10. The system of claim 9, wherein the late message specifies the expected time of arrival of the vehicle determined by the mobile unit.

11. The system of claim 1, wherein the destination information specifies a corresponding appointment time for the vehicle to be at each of a plurality of destinations identified by the destination information, the mobile unit further operable to determine in response to the vehicle position the expected times of arrival of the vehicle at each of the destinations identified by the destination information.

12. The system of claim 11, wherein the mobile unit is further operable to generate late information if the expected time of arrival of the vehicle at one of the destinations identified by the destination information differs from the corresponding appointment time by more than a predetermined amount.

13. The system of claim 12, wherein the mobile unit is further operable to transmit the late information to the dispatch using the communications link.

14. A system for dispatching a vehicle equipped with a mobile unit, comprising:

a dispatch remotely located from the vehicle, the dispatch operable to generate destination information for the vehicle, the destination information specifying a first destination, a stationary interval at the first destination, a second destination, and a corresponding appointment time for the second destination;

a communications link coupled to the dispatch, the communications link operable to receive the destination information for the vehicle from the dispatch; and the mobile unit coupled to the communications link, the mobile unit operable to receive from the communications link the destination information for the vehicle generated by the dispatch, the mobile unit further operable to determine a vehicle position, the mobile unit further operable to determine in response to the vehicle position and the stationary interval the expected time of arrival of the vehicle at the second destination, the mobile unit further operable to determine if the expected time of arrival of the vehicle at the at the second destination differs from the corresponding appointment time for the second destination by more than a predetermined amount.

15. The system of claim 14, wherein the stationary interval is an allotted time to perform a task at the first destination.

16. The system of claim 14, wherein the destination information comprises routing information, the routing information specifying a predetermined route for the vehicle to travel to the second destination.

17. The system of claim 14, wherein the mobile unit comprises a database operable to store routing information, the mobile unit further operable to generate a predetermined route for the vehicle to travel to the second destination in response to the routing information stored on the database.

18. The system of claim 14, wherein the mobile unit comprises a database operable to store routing information, the mobile unit further operable to generate a predetermined route for the vehicle to travel to the second destination in response to the routing information stored on the database, the mobile unit further operable to determine the expected time of arrival of the vehicle at the second destination in response to the routing information.

19. The system of claim 14, wherein the mobile unit is further operable to generate late information if the expected time of arrival of the vehicle at the second destination differs from the corresponding the appointment time by more than a predetermined amount.

20. The system of claim 19, wherein the mobile unit is further operable to transmit the late information to the dispatch using the communications link.

21. The system of claim 20, wherein the late information transmitted to the dispatch specifies the expected time of arrival of the vehicle at the second destination.

22. The system of claim 19, wherein the mobile unit is further operable to display a late message on the vehicle in response to the late information.

23. An apparatus on a vehicle for determining an expected time of arrival of the vehicle, comprising:

a communications device operable to receive destination information from a dispatch, the destination information specifying at least one destination and a corresponding appointment time;

a positioning device operable to determine a vehicle position; and a processor coupled to the communications device and the positioning device, the processor operable to receive destination information from the communications device and the vehicle position from the positioning device, the processor further operable to determine in response to the vehicle position the expected time of arrival of the vehicle at the destination identified by the destination information, the processor further operable to determine if the expected time of arrival differs from the corresponding appointment time for the destination by more than a predetermined amount.

24. The apparatus of claim 23, wherein the communications device is coupled to a cellular telephone network.

25. The apparatus of claim 23, wherein the positioning device comprises a GPS receiver.

26. The apparatus of claim 23, wherein the destination information comprises routing information, the routing information specifying a predetermined route for the vehicle to travel to the destination, the processor further operable to determine the expected time of arrival of the vehicle in response to the routing information.

27. The apparatus of claim 23, wherein the destination information comprises routing information, the routing information specifying a predetermined route for the vehicle to travel to the destination and an expected travel speed along the predetermined route, the processor further operable to determine the expected time of arrival of the vehicle in response to the routing information.

28. The apparatus of claim 23, wherein the processor is further operable to generate late information if the expected time of arrival of the vehicle differs from the appointment time by more than a predetermined amount.

29. The apparatus of claim 28, wherein the communications device is operable to transmit the late information to the dispatch.

30. The apparatus of claim 29, wherein the late information specifies the expected time of arrival of the vehicle determined by the processor.

31. The apparatus of claim 28, further comprising a display operable to display a late message on the vehicle in response to the late information.

32. The apparatus of claim 23, further comprising a database operable to store routing information, the processor being further operable to generate a predetermined route for the vehicle to travel to the destination in response to the routing information stored in the database, the processor further operable to determine the expected time of arrival of the vehicle at the destination in response to the routing information.

33. The apparatus of claim 23, wherein the destination information specifies a plurality of destinations, the processor operable to determine in response to the vehicle position the expected times of arrival of the vehicle at each of the destinations.

34. The apparatus of claim 33, wherein the destination information specifies an appointment time corresponding to each of the destinations, the processor operable to generate late information if the expected time of arrival of the vehicle at one of the destinations differs from the corresponding appointment time by more than a predetermined amount.

35. The apparatus of claim 34, wherein the communications device is further operable to transmit the late information to the dispatch.

36. A method for determining an expected time of arrival of a vehicle, comprising:

generating destination information at a dispatch, the destination information specifying at least one destination and a corresponding appointment time;

transmitting the destination information to the vehicle;

determining at the vehicle the vehicle position;

determining at the vehicle in response to the vehicle position the expected time of arrival of the vehicle at the destination identified by the destination information;

determining at the vehicle whether the expected time of arrival differs from the corresponding appointment time for the destination by more than a predetermined amount.

37. The method of claim 36, wherein the step of transmitting the destination information to the vehicle is performed using a cellular telephone network.

38. The method of claim 36, wherein the step of determining at the vehicle the vehicle position is performed using a GPS receiver.

39. The method of claim 36, further comprising the step of displaying the destination information to an operator of the vehicle.

40. The method of claim 36, further comprising the step of generating late information at the vehicle if the expected time of arrival of the vehicle differs from the appointment time by more than a predetermined amount.

41. The method of claim 40, further comprising the step of displaying the late information to an operator of the vehicle.

42. The method of claim 40, further comprising the step of transmitting the late information to the dispatch.

43. The method of claim 40, further comprising the steps of:

transmitting the late information to the dispatch;

generating updated destination information at the dispatch in response to the late information; and transmitting the updated destination information to the vehicle.

44. A method for determining an expected time of arrival of a vehicle, comprising:

generating destination information at a dispatch, the destination information specifying a plurality of destinations and a plurality of corresponding appointment times;

transmitting the destination information to the vehicle;

determining at the vehicle the vehicle position;

determining at the vehicle in response to the vehicle position an expected time of arrival of the vehicle at one or more of the destinations;

determining at the vehicle whether the expected time of arrival at one or more of the destinations differs from the corresponding appointment time by more than a predetermined amount; and generating late information if the expected time of arrival at one or more destinations differs from the corresponding appointment time by more than the predetermined amount.

45. The method of claim 44, wherein the step of transmitting the destination information to the vehicle is performed using a cellular telephone network.

46. The method of claim 44, wherein the step of determining at the vehicle the vehicle position is performed by a GPS receiver.

47. The method of claim 44, further comprising the step of transmitting the late information to the dispatch.

48. The method of claim 44, further comprising the steps of:

transmitting the late information to the dispatch;

determining updated destination information at the dispatch in response to the late information; and transmitting the updated destination information to the vehicle.

49. The system of claim 1, wherein:

the dispatch is further operable to configure a failure count parameter; and the mobile unit is further operable to maintain a count of a number of calculations of expected time of arrival that are later than the corresponding appointment time, the mobile unit further operable to generate and transmit late information if the maintained count exceeds the failure count parameter.

50. The apparatus of claim 23, wherein:

the destination information specifies a failure count parameter; and the processor is further operable to maintain a count of a number of calculations of expected time of arrival that are later than the corresponding appointment time, the processor further operable to generate and transmit late information if the maintained count exceeds the failure count parameter.

51. The method of claim 36, further comprising the steps of:

configuring at the dispatch a failure count parameter;

transmitting the failure count parameter to the vehicle;

maintaining at the vehicle a count of a number of calculations of expected time of arrival that are later than the corresponding appointment time;

generating and transmitting late information at the vehicle if the maintained count of a number of calculations of expected time of arrival that are later than the corresponding appointment time exceeds the failure count parameter.

* * * * *

UNITED STATES PATENT AND TRADEMARK OFFICE
CERTIFICATE OF CORRECTION

PATENT NO. : 5,724,243
DATED : March 3, 1998
INVENTOR(S) : Westerlage, et al.

It is certified that error appears in the above-identified patent and that said Letters Patent is hereby corrected as shown below:

Column 16, line 19, after "vehicle", delete first occurrence of "at the".

Signed and Sealed this

Twenty-sixth Day of May, 1998

Attest:

BRUCE LEHMAN

*Attesting Officer*   *Commissioner of Patents and Trademarks*